US012574378B2

(12) United States Patent　　　　(10) Patent No.:　US 12,574,378 B2
Dalla et al.　　　　　　　　　　　　(45) Date of Patent: 　　Mar. 10, 2026

(54) AUTO-TAGGING OF SANCTIONED SAAS APPLICATIONS

(71) Applicant: Palo Alto Networks, Inc., Santa Clara, CA (US)

(72) Inventors: Mohammed Mohsin Dalla, Bengaluru (IN); Priyanka Neelakrishnan, San Jose, CA (US); Zeeshan Sajid, Elk Grove, CA (US); Krishna Rao Anumothu, Santa Clara, CA (US); Pravah Manchala, Bengaluru (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 54 days.

(21) Appl. No.: 18/679,659

(22) Filed: May 31, 2024

(65) Prior Publication Data

US 2025/0373613 A1　　　Dec. 4, 2025

(51) Int. Cl.
*H04L 9/40*　　　　(2022.01)
*H04L 67/02*　　　(2022.01)
*H04L 67/10*　　　(2022.01)
(52) U.S. Cl.
CPC ............ *H04L 63/101* (2013.01); *H04L 63/10* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 11,475,146 B2 * | 10/2022 | Chauhan | ................. | H04L 67/02 |
| 12,041,053 B2 * | 7/2024 | Deshmukh | .......... | H04L 63/0263 |
| 2018/0027006 A1 * | 1/2018 | Zimmermann | ..... | H04L 63/0227 726/11 |
| 2020/0153911 A1 * | 5/2020 | Chauhan | .............. | H04L 65/403 |
| 2020/0153920 A1 * | 5/2020 | Chauhan | ................ | H04L 67/55 |
| 2024/0430303 A1 * | 12/2024 | Lu | ........................... | H04L 63/20 |
| 2025/0005130 A1 * | 1/2025 | Hamiel | .................. | G06F 21/44 |
| 2025/0300939 A1 * | 9/2025 | Dao | .................... | H04L 47/2483 |

* cited by examiner

*Primary Examiner* — Lashonda Jacobs-Burton
(74) *Attorney, Agent, or Firm* — Gilliam IP PLLC

(57) ABSTRACT

A system has been created to automatically identify and tag sanctioned applications. The disclosed auto-tagging system correlates identifying data of the different security perspectives based on fuzzy matching and creates mappings among application names of the different security perspectives based on correlations in the identifying data. With the mappings, groups of sanctioned applications can be automatically tagged (or recommended for tagging) as sanctioned across the security perspectives despite variations in naming. This automated, rapid propagation of sanctioned state by tagging provides a complete end-to-end view into the state of SaaS applications used in a customer environment and quickly secures these applications.

20 Claims, 5 Drawing Sheets

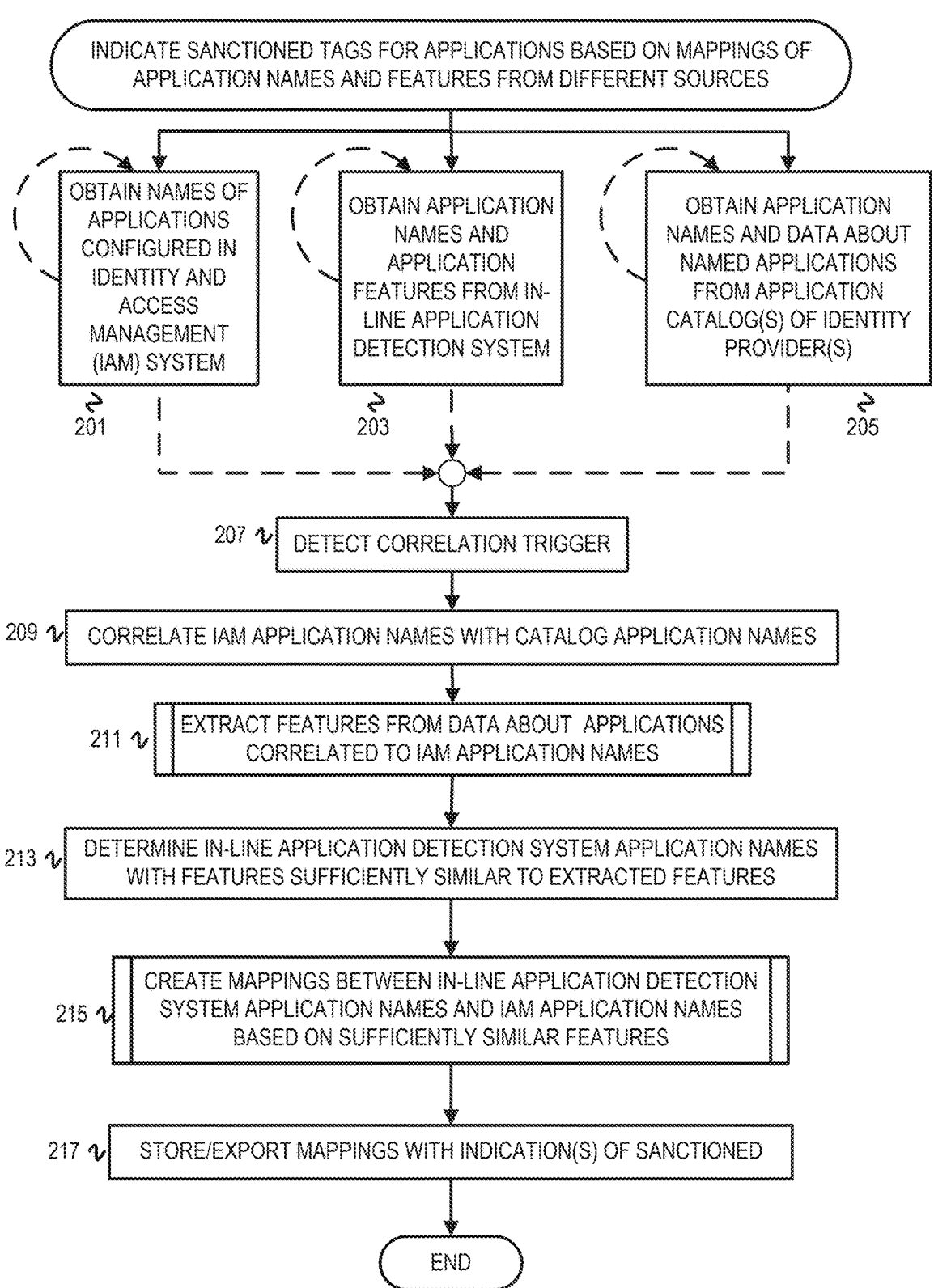

INDICATE SANCTIONED TAGS FOR APPLICATIONS BASED ON MAPPINGS OF APPLICATION NAMES AND FEATURES FROM DIFFERENT SOURCES

OBTAIN NAMES OF APPLICATIONS CONFIGURED IN IDENTITY AND ACCESS MANAGEMENT (IAM) SYSTEM

201

OBTAIN APPLICATION NAMES AND APPLICATION FEATURES FROM IN-LINE APPLICATION DETECTION SYSTEM

203

OBTAIN APPLICATION NAMES AND DATA ABOUT NAMED APPLICATIONS FROM APPLICATION CATALOG(S) OF IDENTITY PROVIDER(S)

205

207  DETECT CORRELATION TRIGGER

209  CORRELATE IAM APPLICATION NAMES WITH CATALOG APPLICATION NAMES

211  EXTRACT FEATURES FROM DATA ABOUT APPLICATIONS CORRELATED TO IAM APPLICATION NAMES

213  DETERMINE IN-LINE APPLICATION DETECTION SYSTEM APPLICATION NAMES WITH FEATURES SUFFICIENTLY SIMILAR TO EXTRACTED FEATURES

215  CREATE MAPPINGS BETWEEN IN-LINE APPLICATION DETECTION SYSTEM APPLICATION NAMES AND IAM APPLICATION NAMES BASED ON SUFFICIENTLY SIMILAR FEATURES

217  STORE/EXPORT MAPPINGS WITH INDICATION(S) OF SANCTIONED

END

FIG. 2

AUTO-TAGGING OF SANCTIONED SAAS APPLICATIONS

BACKGROUND

The disclosure generally relates to security arrangements for protecting computers (e.g., CPC subclass G06F 21/62) and pattern recognition (e.g., subclass CPC G06F 16/24).

Cloud service providers/platforms (CSPs) provide cloud computing technology that deliver computing resources in the cloud. With cloud computing, applications and other computing resources traditionally hosted on-premises are delivered by a CSP over the Internet. CSPs offer Anything-as-a-Service (XaaS) solutions, such as Infrastructure-as-a-Service (IaaS), Platform-as-a-Service (PaaS), and Software-as-a-Service (SaaS), which provide cloud-based infrastructure, cloud-based platforms, and cloud-based applications, respectively. A variety of vendors of hardware technology and software technology employ the services of CSPs for hosting technology in the cloud instead of or in addition to on-premises as hardware and software have traditionally been delivered. End users of a CSP, including such vendors of cloud-delivered technology, can interact with the CSP via application programming interfaces (APIs) of the CSP. Cloud APIs provide an interface for managing computing resources or utilizing the services of a CSP. To inform end users of the available functionality of the CSP that can be invoked via the cloud API exposed by the CSP, the CSP provides documentation for the cloud API that indicates functions of the cloud API, the associated request and response parameters, and any corresponding descriptions.

Cloud security posture management (CSPM) refers to management of security risks of cloud infrastructure, cloud infrastructure encompassing the software and hardware resources of a CSP. For a customer of a CSP, CSPM refers to management of the security risks to customer cloud assets (i.e., application(s), workload, and/or data). While the CSP is responsible for CSPM of the infrastructure provided by the CSP, the CSPM of customer assets involves monitoring assets for risks and compliance auditing based on policy definitions, scanning to ensure policy compliance, and remediation of detected risks. Scanning or searching for risks, such as misconfigurations, can be across cloud environments/infrastructure of different delivery models including IaaS, PaaS, and SaaS.

BRIEF DESCRIPTION OF THE DRAWINGS

Embodiments of the disclosure may be better understood by referencing the accompanying drawings.

FIG. 2 is a flowchart of example operations for indicating sanctioned tags for applications based on mappings of application names and features from different sources.

DESCRIPTION

Figure 1:
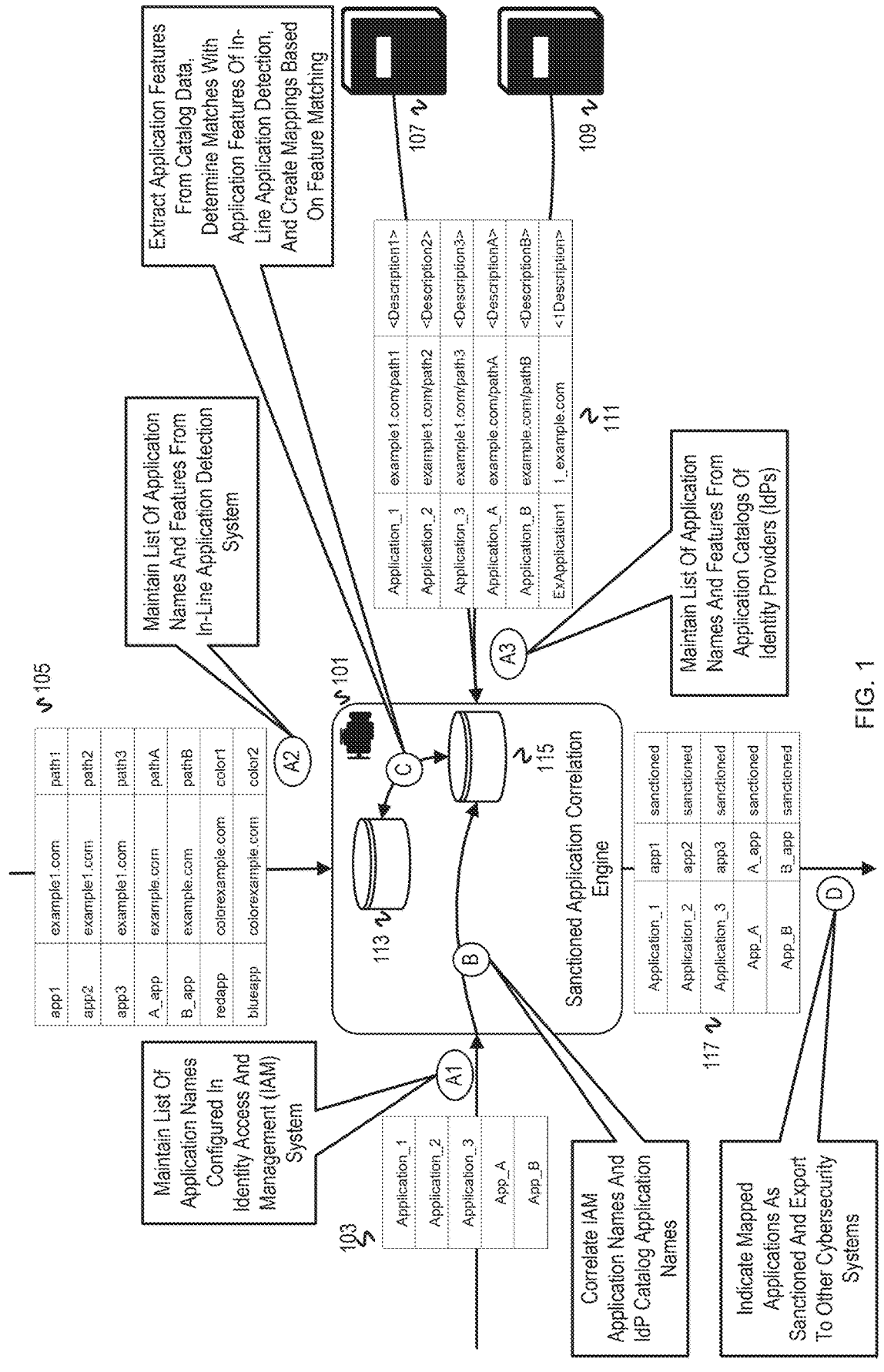
FIG. 1 is a diagram of a sanctioned application correlation engine within a cybersecurity system that automatically determines which applications should be tagged as sanctioned despite naming variations within the cybersecurity system.

The description that follows includes example systems, methods, techniques, and program flows to aid in understanding the disclosure and not to limit claim scope. Well-known instruction instances, protocols, structures, and techniques have not been shown in detail for conciseness.

Terminology

The description refers to "sanctioned" applications. The use of this tag in the industry is common. A sanctioned application is an application permitted or allowed to be used within an organization or tenant.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Introduction

The information technology (IT) administrator of an organization is tasked with distinguishing between SaaS applications that have been approved for use within the organization ("sanctioned SaaS applications") and those that lack approval ("unsanctioned SaaS applications"). The approval process involves determining usage patterns of the SaaS applications, assessing associated risks, and implementing security policies for effective management. Tagging can be used to manage the distinction between sanctioned and unsanctioned SaaS applications. The identification and tagging of an application as sanctioned or unsanctioned is a tedious, manual task. With large and growing numbers of SaaS applications, it becomes practically impossible to manage the applications efficiently. A current catalog of SaaS applications managed by a security vendor exceeds 65,000 SaaS applications. A security vendor can discover thousands of SaaS applications being used in a customer environment. Reviewing each of the discovered applications to tag as sanctioned or unsanctioned is often not done due to the task being so labor intensive. The continuous introduction and adoption of SaaS applications compounds the challenge. Moreover, sensitive data is increasingly uploaded, created, shared, and exposed across multiple sanctioned applications, which increases vulnerability to loss and theft. Thus, sanctioned SaaS applications must also be monitored to determine whether sanctioned SaaS applications are properly configured.

Overview

A system has been created to automatically identify and tag sanctioned SaaS applications which facilitates rapid security coverage of applications. Typically, the initial step to onboard an application for an organization is to configure an identity access and management (IAM) system of the organization to allow users of the organization to access the sanctioned application. As a SaaS application, the sanctioned application falls within CSPM. Implementation of CSPM involves multiple services and/or systems. For instance, an organization's CSPM implementation can at least include a data security service and a Cloud Access Security Broker (CASB) for CSPM or SaaS Security Posture Management (SSPM). More generally, implementation of CSPM involves inline security and out-of-band security at different monitoring points. These different security perspectives are not constrained to standardized names for applications. The disclosed auto-tagging system correlates identifying data of the different security perspectives based on fuzzy matching and creates mappings among application names of the different security perspectives based on correlations in the identifying data. With the mappings, groups of sanctioned applications can be automatically tagged (or recommended for tagging) as sanctioned across the security perspectives despite variations in naming. This automated, rapid propagation of sanctioned state by tagging provides a complete end-to-end view into the state of SaaS applications used in a customer environment and quickly secures these applications.

Example Illustrations

FIG. 1 is a diagram of a sanctioned application correlation engine within a cybersecurity system that automatically determines which applications should be tagged as sanctioned despite naming variations within the cybersecurity system. A cybersecurity system, such as a cybersecurity platform, includes different subsystems or components for different cybersecurity perspectives which are deployed across different monitoring points. In light of the different possibilities for architecture and deployment of a cybersecurity system, the term "system" will be used instead of component or subsystem. FIG. 1 illustrates a sanctioned application correlation engine 101 within a cybersecurity platform that interacts with systems for IAM and in-line application identification/detection. FIG. 1 indicates that the sanctioned application correlation engine 101 also interacts with "other" cybersecurity systems. Examples of these include a CASB and data security/data leakage prevention. Although the sanctioned application correlation engine 101 (hereinafter "engine") can be implemented to automatically tag or recommend tags, the description refers to automatically tagging or auto-tagging for succinctness. The auto-tagging by the engine 101 is based on a presumption that the IAM system for an organization is an authoritative source for identifying sanctioned applications. Even if an application is onboarded for an organization at a different security perspective, which suggests it is sanctioned, the application cannot be accessed until configured in the IAM system of the organization. Thus, the IAM system is treated as the authoritative source for sanctioned applications.

FIG. 1 is annotated with a series of letters A1-A3 and B-D, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stages A1-A3, the engine 101 maintains lists (i.e., data structures or repositories) of information from multiple sources to correlate and resolve variations in application names. The example depicted by FIG. 1 presumes that the engine 101 maintains each list by obtaining updates from corresponding data source. The engine 103 can be configured to obtain the updates according to a scheduler. The updates are not necessarily synchronized across data sources.

At stage A1, the engine 101 maintains a list of application names configured in the IAM system. As previously stated, these applications named in the application names from the IAM system are treated as sanctioned applications based on a presumption that configuration in the IAM of an organization implies it being a sanctioned application. FIG. 1 presents example applications in a list 103 from the IAM system. The list 103 includes application names "Application_1", "Application_2", "Application_3", "App_A", and "App_B". The IAM system of an organization has been configured to allow users of the organization to access or login to the named applications.

At stage A2, the engine 103 maintains a list of application names and features from the in-line application detection system. A list 105 from the in-line application detection system includes multiple entries, each entry including an application name associated with features corresponding to the named application. The list 105 includes the below example entries.

| Application Name | Domain feature | URL Path Feature |
|---|---|---|
| app1 | example1.com | path1 |
| app2 | example1.com | path2 |
| app3 | example1.com | path3 |
| A_app | example.com | pathA |
| B_app | example.com | pathB |
| redapp | colorexample.com | color1 |
| blueapp | colorexample.com | color2 |

In this simple example, each named application is associated with 2 application features: domain and URL path. Presumably, access to the named application involves requesting a resource(s) in the path of the identified domain. To identify an application, the in-line application detection system scans network traffic and identifies an application as being detected in a session based on detection of the collection of features. In contrast to the applications named in the list 103, the applications named in the list 105 are not presumed sanctioned.

At stage A3, the engine 103 maintains a list of application names and features from application catalogs 107, 109 of IdPs. Data from the application catalogs 107, 109 is combined into a list 111. The list 111 includes multiple entries, each entry including an application name associated with a URL of the named application and a description of the named application. The list 111 includes the below example entries.

| Application Name | URL | Description |
|---|---|---|
| Application_1 | example1.com/path1 | <Description1> |
| Application_2 | example1.com/path2 | <Description2> |
| Application_3 | example1.com/path3 | <Description3> |
| Application_A | example.com/pathA | <DescriptionA> |
| Application_B | example.com/pathB | <DescriptionB> |
| ExApplication1 | 1_example.com | <1Description> |

When a vendor submits an application to be supported by an IdP, the vendor will typically enter the URL for accessing the application and a description of the application.

Although the applications names from the IAM system are for applications available in the catalogs 107, 109, a user may have configured an application with a name that deviates from the naming in the catalogs. In this illustration, the naming for applications "Application_1", "Application_2", and "Application_3" is consistent between the IAM system and the catalogs 107, 109. However, the applications "Application_A" and "Application_B" are named "App_A" and "App_B" in the list 103 from the IAM system. Moreover, the naming of applications in the list 105 sometimes deviates from both the IAM system and the catalogs 107, 109. The applications "app1", "app2", "app3" respectively correspond to "Application_1", "Application_2", "Application_3". Similarly, the applications named in the list 111 as "Application_A" and "Application_B" are respectively named as "A_app" and "B_app" in the list 105.

At stage B, the engine 101 correlates the IAM application names and the IdP catalog application names. Correlation can be based on string matching since most applications will likely be named the same in the IAM system and the catalogs 107, 109. To address variations, fuzzy matching can be used to correlate IAM application names and IdP catalog application names. This correlation is performed to propagate the data about applications from the catalogs 107, 109 to the IAM application names. In this example illustration, the engine 101 determines the below correlations.

| IAM Application Name | IdP Catalog Application Name | URL | Description |
|---|---|---|---|
| Application_1 | Application_1 | example1.com/path1 | <Description1> |
| Application_2 | Application_2 | example1.com/path2 | <Description2> |
| Application_3 | Application_3 | example1.com/path3 | <Description3> |
| App_A | Application_A | example.com/pathA | <DescriptionA> |
| App_B | Application_B | example.com/pathB | <DescriptionB> |

At stage C, the engine 101 extracts application features from the catalog data. The engine 101 then determines matches between application features of in-line application detection and the extracted features. Matches between the application features are determined based on sufficient similarity, such as with fuzzy matching. The engine 101 determines matches based on sufficient similarity according to the matching algorithm being used. Below are matches based on the illustrated example.

| Features from In-Line Application Detection System | | Features Extracted from Catalog Data | |
|---|---|---|---|
| Domain feature | URL Path Feature | | Keywords from Descriptions |
| example1.com | path1 | example1.com/path1 | <keywords> |
| example1.com | path2 | example1.com/path2 | <keywords> |
| example1.com | path3 | example1.com/path3 | <keywords> |
| example.com | pathA | example.com/pathA | <keywords> |
| example.com | pathB | example.com/pathB | <keywords> |

The engine 101 creates mappings based on feature matching. With the application features extracted from the catalog data having been propagated to the IAM application names, the mappings are between the IAM application names and the in-line application detection application names. Using the illustrated example names and features, the engine 101 creates the application name mappings below.

| IAM Application Name | In-Line Application Detection Application Name |
|---|---|
| Application_1 | app1 |
| Application_2 | app2 |
| Application_3 | app3 |
| App_A | A_app |
| App_B | B_app |

At stage D, the engine 101 indicates the applications named in the name mappings as sanctioned and exports the mappings to other cybersecurity systems. The other cybersecurity systems can use the mappings for security settings related to the named applications, such as for onboarding applications. Indication of the applications named in the mappings can be explicit (e.g., setting a flag in each entry of the mappings), or implicit (e.g., setting a value in a message header indicating that communicated applications correspond to sanctioned applications).

FIG. 2 is a flowchart of example operations for indicating sanctioned tags for applications based on mappings of application names and features from different sources. The description refers to the engine as performed the described operations for consistency with FIG. 1.

At block 201, the engine obtains names of applications configured in the IAM system. The engine can subscribe to the IAM system for updates in applications registered/configured in the IAM system. The IAM system could be configured to post updates to a memory accessible to the engine. Obtaining the names is set to recur periodically according to a schedule as represented by the dashed line that returns to block 201. Obtaining the names can be querying via an application programming interface (API) of the IAM system or reading a specified memory location.

At block 203, the engine obtains application names and application features from an in-line application detection system. Similar to obtaining the application names from the IAM system, the engine can obtain the information differently depending upon implementation. The engine can recurrently query the in-line application detection system via an API. The engine can read a specified memory location to which the in-line application detection system is configured to write. The scheduled periodic obtaining of application names and features from the in-line application detection system can be on a same or different schedule than obtaining the application names from the IAM system. Recurrently obtaining the names is represented by the dashed line that returns to block 203.

At block 205, the engine obtains application names and data about named applications from a catalog(s) of applications supported by an IdP(s). The engine recurrently requests this data from the catalogs or scrapes the data from the catalogs. Recurrently obtaining the names and application data is represented by the dashed line that returns to block 205.

At block 207, the engine detects a correlation trigger. While the engine asynchronously obtains or collects names, features, and application data from the different sources, detection of the correlation triggers causes the engine to process the obtained information. The trigger can be time-based (e.g., daily) or event-driven (e.g., onboarding of an application in a system or detection of x new applications in the catalog data).

At block 209, the engine correlates IAM application names with the catalog application names. The engine can rely solely on string match to avoid false positives. However, implementations can choose to use fuzzy matching between the IAM application names and the IdP catalog application names.

Figure 3:
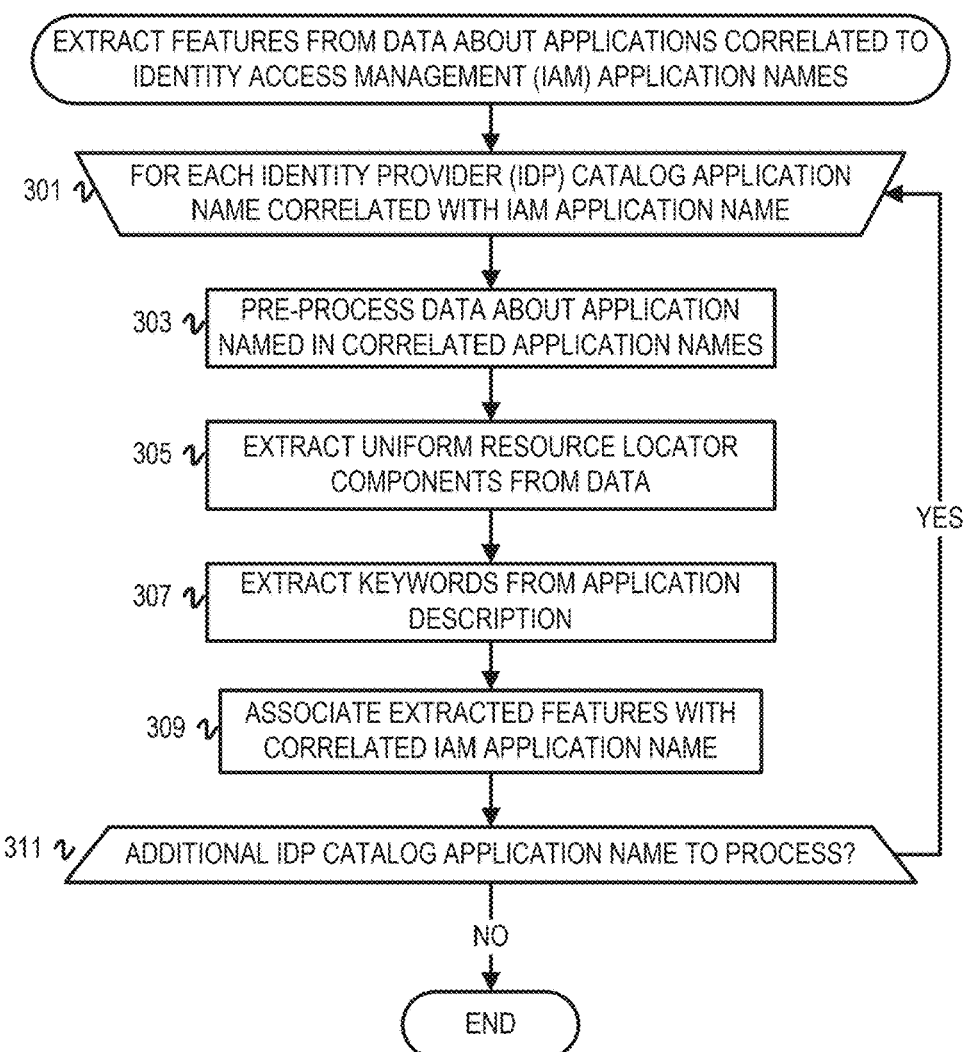
FIG. 3 is a flowchart of example operations for extracting features from data about applications correlated to identity access and management (IAM) application names.

At block 211, the engine extracts features from data about applications correlated to IAM application names. For those of the applications named in the catalog determined to be correlated with the IAM application names, the application data is processed to extract features and the extracted features associated with the IAM application names. FIG. 3 provides more example operations for block 211.

At block 213, the engine determines which of the in-line application detection system features have sufficient similarity with extracted features. Examples of features other than URL components include display name, SaaS vendor, home page URL, description, and configuration template. A criterion for sufficiently similar will depend upon implementation of fuzzy matching. A list of example fuzzy matching algorithms that can be used include Levenshtein distance, Hamming distance, Damerau-Levenshtein distance, N-gram similarity, and Jaccard similarity.

Figure 4:
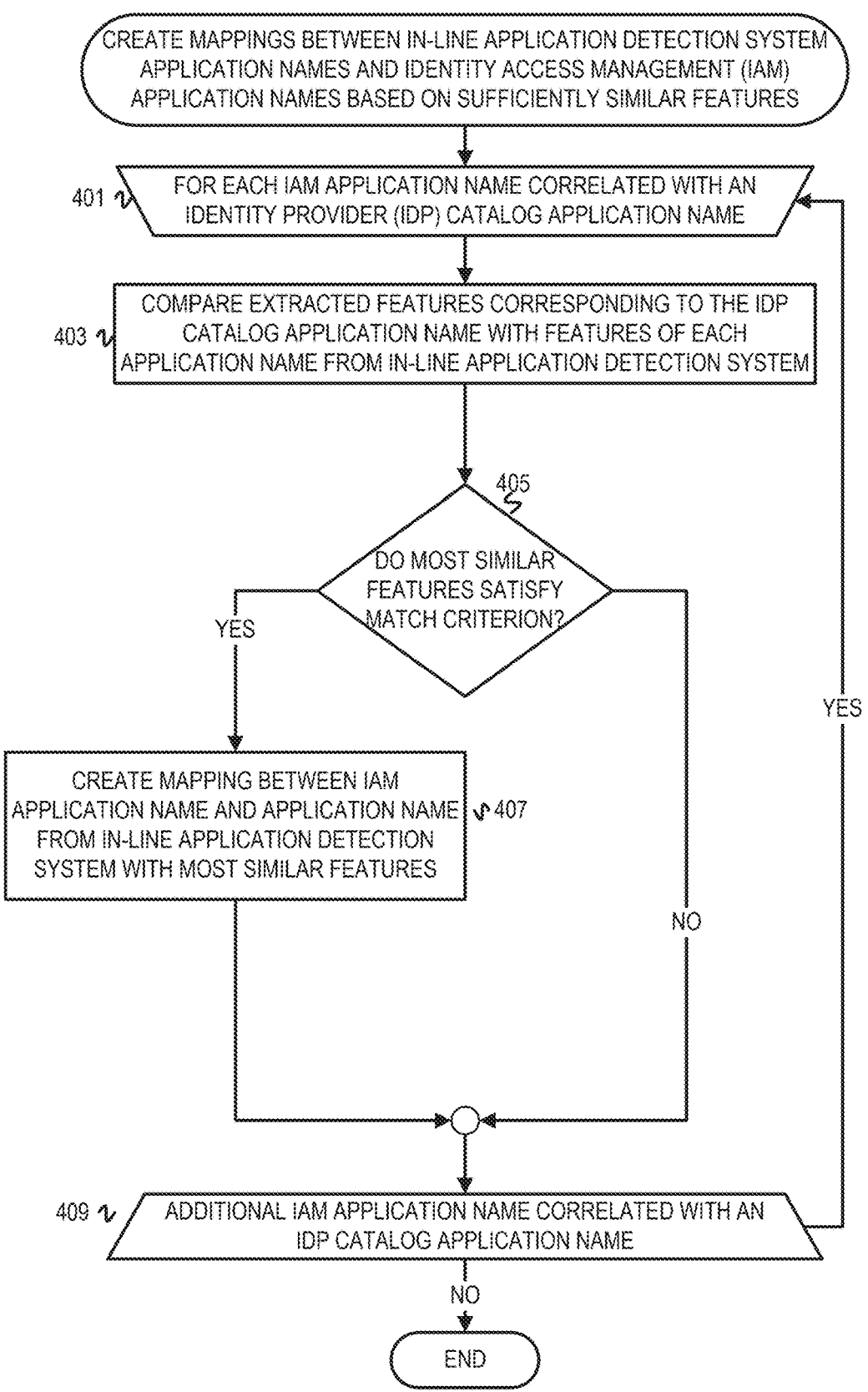
FIG. 4 is a flowchart of example operations for creating mappings between in-line application detection system application names and IAM application names based on sufficiently similar features.

At block 215, the engine creates mappings between in-line application detection application names and IAM application names based on the determination of sufficiently similar application features. FIG. 4 provides example operations for block 215.

At block 217, the engine stores/exports mappings with an indication(s) of named applications that are sanctioned. The engine can set a tag/flag for each entry in the mappings to indicate the named application of the entry/mapping is sanctioned. An implementation may write the mappings to a repository of sanctioned or recommended to be sanctioned applications. The sanctioned tags may surface when an application is being onboarded or security posture is being evaluated. A user can search for an application in a user interface and be presented with matching applications with tags of sanctioned or unsanctioned. In some cases, exporting the mappings with indication(s) of sanctioned can be removing an unsanctioned tag. As another example of surfacing the sanctioned indication, a filter can be set in a user interface to present all applications recommended to be sanctioned. Since the indication of sanctioned is relying on an assumption that the IAM is authoritative, this can be given less deference and allowing for greater control of application sanctioning by presenting the sanctioned indication as a recommendation.

FIG. 3 is a flowchart of example operations for extracting features from data about applications correlated to IAM application names. Since the application data has been retrieved or obtained from catalogs, at least some of the data may be structured. Thus, some of the processing can be guided by field names or keys. However, an application description will likely be unstructured data and therefore involve keyword searching and/or natural language processing.

At block 301, the engine begins processing application data of each IdP catalog application name correlated with an IAM application name. The correlation of IAM application names and IdP catalog application names can create references from the IAM application name entries to the IdP catalog entries.

At block 303, the engine pre-processes the data about the application named in the correlated application names. Pre-processing can include searching for keys or field names, cleaning text, normalizing text, etc.

At block 305, the engine extracts URL components from the application data. URL components, such as a domain name and pathname, are often used for in-line application detection. Submission of an application into the IdP catalog will have required a URL to access the application. The URL components may be in a specified field or in the description.

At block 307, the engine extracts keywords from the application description. An embodiment may generate a list of keywords to extract from application descriptions based on the application features used for in-line detection of an application. Keywords to extract can be specified in advance. Natural language processing (NLP) of the description can be used for extracting other keywords. For instance, NLP can be used to identify and extract keywords in a description of an application connector by prompting an NLP process for descriptive keywords. As another example, NLP logic can be programmed to identify keywords based on stop words and/or words that relate words. For instance, the keywords "StorageCorp Business" can be identified and extracted from an application description "IdP2 connector for StorageCorp Business by vendorABC."

At block 309, the engine associates the extracted features with the correlated IAM application name. This effectively propagates the extracted features to the IAM application names correlated to the IdP catalog application names. For example, the engine populates a data structure with the correlated names and extracted features.

At block 311, the engine determines whether there is an additional IDP catalog application name that has been correlated with an IAM application name to process. If so, then operations flow returns to block 301. Otherwise, operational flow of FIG. 3 ends.

FIG. 4 is a flowchart of example operations for creating mappings between in-line application detection system application names and IAM application names based on sufficiently similar features. The creation of a mapping is the addition or insertion of an entry or record to a data structure. A mapping indicates an association or relationship between data, in this case application names.

At block 401, the engine begins processing each IAM application name correlated with an IdP catalog application name. When determining the correlations between IAM application names and IdP catalog application names, the engine may have created an in-memory structure with the correlations and then iterate over the entries of the structure.

At block 403, the engine compares extracted features corresponding to the IdP catalog application name with features of each application name from in-line application detection system. For instance, the engine iteratively runs a fuzzy matching algorithm on the extracted features of the application named by the correlated IAM and IdP catalog application names and the features of each in-line application detection application name. For the comparison, the engine creates a string from the extracted features and a string from the in-line application detection application features, for example concatenating the features. From the comparison, the engine obtains similarity or distance measurements.

At block 405, the engine determines whether the in-line application detection application features most similar to the extracted features satisfy a match criterion. A match criterion is defined with a minimum similarity or distance measurement. If the in-line application detection application features with the highest similarity measurement or lowest distance measurement satisfies the criterion for applications to be treated as sufficiently similar, then operational flow proceeds to block 407. Otherwise, operational flow proceeds to block 409.

At block 407, the engine creates a mapping between the IAM application name and the application name from the in-line application detection system with the most similar features. The mapping indicates that the different application names actually identify the same application. Since the different names are naming the same application, the presumed allowability of the application based on its presence in IAM can be attached to other names of the same application.

The example operations are described with reference to a sanctioned application correlation engine. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

Variations

Embodiments are not limited to the described examples. For instance, embodiments can use a multi-stage process to compare extracted features and determine matches for creating mappings. In a first stage, similarity of URL-based features is used to identify similar applications. For example, a subset of applications are identified for second stage comparison based on similarity of URL-based features. In some cases, the URL-based feature comparison yields groups or different subsets of similar applications. In a second stage, the other features (e.g., non-URL features or keyword features) of a group or subset of similar applications are compared, for instance with an implementation of the token sort ratio algorithm. If a matching score from the keyword features comparison satisfies a threshold indicating high probability of the applications being similar, then mappings are created between names of the applications that satisfied the threshold.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 305 and 307 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
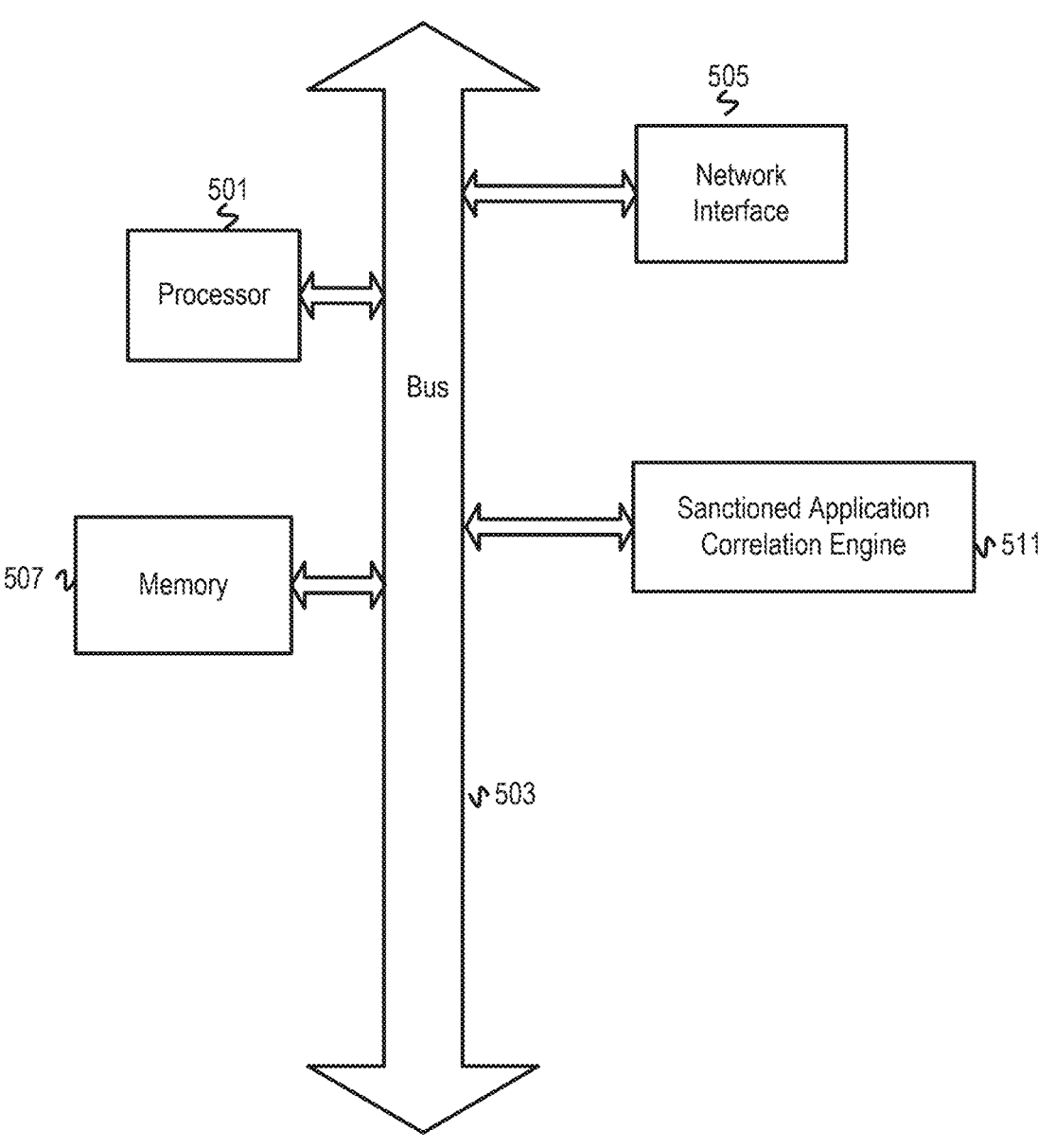
FIG. 5 depicts an example computer system with a correlation engine for correlating application names based on application features.

FIG. 5 depicts an example computer system with a correlation engine for correlating application names based on application features. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a sanctioned application correlation engine 511. The sanctioned application correlation engine 511 leverages presumed approval of applications configured in IAM to inform tagging of other naming variations of approved applications across different systems or subsystems of a cybersecurity system with a sanctioned tag or recommendation for a sanctioned tag. To resolve the naming variations, application names in the IAM are correlated with application names pulled or retrieved from application catalogs of IdPs. These correlations are used to select the catalog data of applications named in the catalog and correlated with the IAM application names. This allows the sanction application correlation engine to limit further analysis to presumably sanctioned applications as evidenced by the presence of their names in the IAM. The sanctioned application correlation engine 511 extracts features from the catalog data which are then used to match features used for in-line application detection based on sufficient similarity. Then the application names from the in-line application detection system can be mapped to the IAM application names correlated with IdP catalog application names. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:
obtaining a first list of application names from an identity access and management (IAM) system of an organization, metadata for software-as-a-service (SaaS) applications from a first catalog of SaaS applications, and a second list of application names determined for in-line cybersecurity and first identifying data corresponding to the second list of application names;
extracting second identifying data from the metadata;
determining correlations between the first list of application names and the second identifying data and between the first identifying data and the second identifying data based, at least partly, on fuzzy matching;
creating mappings between the first list of application names and the second list of applications names based on the correlations; and
indicating as sanctioned those of the second list of application names with mappings to the first list of application names.

2. The method of claim 1, wherein indicating as sanctioned comprises indicating recommendations to tag as sanctioned those of the second list of application names with mappings to the first list of application names.

3. The method of claim 2 further comprising determining whether a first of the recommendations corresponding to a first of those of the second list of application names with a first of the mappings to a first of the first list of application names is rejected or accepted and updating a first mapping based on whether the first recommendation is rejected or accepted.

4. The method of claim 1, wherein indicating as sanctioned comprises tagging as sanctioned those of the second list of application names with mappings to the first list of application names.

5. The method of claim 1, wherein tagging as sanctioned those of the second list of application names with mappings to the first list of application names comprises updating an inline-cybersecurity system corresponding to cloud security posture management with the tagging.

6. The method of claim 1 further comprising updating a listing of applications used for cloud security posture management with the mappings, wherein indicating as sanctioned those of the second list of application names with mappings to the first list of application names comprises updating the listing of applications with the indications.

7. The method of claim 1, wherein obtaining the first list of application names comprises obtaining the first list of application names from an IAM service configured with a set of one or more Identity Providers and the first catalog of SaaS applications is for the set of Identity Providers.

8. The method of claim 1, further comprising recurrently accessing the identity access and management system to obtain a current list of application names configured in the identity and access management system and recurrently accessing the first catalog to determine metadata of newly listed SaaS applications and/or updates to metadata of SaaS applications listed in the first catalog.

9. The method of claim 1, wherein the second identifying data comprise uniform resource locators (URLs), URL paths, URL domains, and redirect URLs.

10. The method of claim 1, wherein the first identifying data is used by in-line cybersecurity to detect in network traffic SaaS applications named in the second list of application names.

11. The method of claim 1 further comprising onboarding each sanctioned application for at least one of security posture management and data security.

12. A non-transitory, machine-readable medium having program code stored thereon, the program code comprising instructions to:
determine first features of applications named in a first list of application names, wherein the first list corresponds to applications configured in an identity and access management system of an organization and the first features are determined from one or more application catalogs of one or more identity providers;
determine matches between second features of applications and the first features, wherein a second list of application names is associated with the second features for detecting applications named in the second list in network traffic;
create mappings between application names in the first list and application names in the second list based, at least partly, on matches between the first and second features; and
indicate, for each application named in the mappings, a sanctioned tag or recommendation for a sanctioned tag.

13. The non-transitory, machine-readable medium of claim 12, wherein the program code further comprises instructions to maintain the first list based on updates from the identity and access management system and a third list based on updates from the one or more application catalogs, wherein entries in the third list comprise application names and application descriptions.

14. The non-transitory, machine-readable medium of claim 13, wherein the program code further comprises instructions to extract the first features from the application descriptions.

15. The non-transitory, machine-readable medium of claim 12, wherein the program code comprises instructions to maintain the second list based on updates from an in-line cybersecurity system that scans network traffic to detect applications based on the second features.

16. The non-transitory, machine-readable medium of claim 12, wherein the program code further comprises instructions to export the mappings with the indications of sanctioned to one or more systems for application onboarding.

17. The non-transitory, machine-readable medium of claim 12, wherein the instructions to determine matches comprise instructions to determine matches based on fuzzy matching between the first and the second features.

18. An apparatus comprising:
a processor; and
a non-transitory machine-readable medium having instructions stored thereon that are executable by the processor to cause the apparatus to, determine first features of applications named in a first list of application names, wherein the first list corresponds to applications configured in an identity and access management system of an organization and the first features are determined from one or more application catalogs of one or more identity providers;

determine matches between second features of applications and the first features, wherein a second list of application names is associated with the second features for detecting in network traffic applications named in the second list;

create mappings between application names in the first list and application names in the second list based, at least partly, on matches between the first and second features; and indicate, for each application named in the mappings, a sanctioned tag or recommendation for a sanctioned tag.

19. The apparatus of claim 18, wherein the instructions to determine matches comprise instructions executable by the processor to cause the apparatus to determine matches based on fuzzy matching between the first and the second features.

20. The apparatus of claim 18, wherein the machine-readable medium further has stored thereon instructions to:

maintain the first list based on updates from an identity and access management system and a third list based on updates from the one or more application catalogs, wherein entries in the third list comprise application names and application descriptions; and extract the first features from the application descriptions.

\* \* \* \* \*